United States Patent [19]
Bowlen

[11] Patent Number: 5,647,719
[45] Date of Patent: Jul. 15, 1997

[54] MOTORCYCLE TOWING DEVICE

[76] Inventor: Donald R. Bowlen, 4712 Appleton, Kansas City, Mo. 64133

[21] Appl. No.: 515,320

[22] Filed: Aug. 15, 1995

[51] Int. Cl.$^6$ ........................................... B60P 9/00
[52] U.S. Cl. ...................... 414/462; 414/563; 224/495; 224/511; 224/924
[58] Field of Search ...................... 414/426, 427, 414/428, 429, 462, 563; 224/489, 491, 495, 509, 511–521, 924; 280/402

[56] References Cited

U.S. PATENT DOCUMENTS

| | | | |
|---|---|---|---|
| 3,740,074 | 6/1973 | Coil | 280/402 |
| 3,892,321 | 7/1975 | Westbrook, Jr. | 414/462 |
| 3,912,098 | 10/1975 | Nicotra | 414/462 |
| 3,963,129 | 6/1976 | Clayton | 414/563 |
| 4,034,872 | 7/1977 | Jager | 414/462 |
| 4,738,581 | 4/1988 | Kuhlman . | |
| 4,778,333 | 10/1988 | Youmans et al. . | |
| 4,836,737 | 6/1989 | Holmes et al. | 414/563 |
| 4,875,269 | 10/1989 | Crist | 280/402 |
| 4,958,980 | 9/1990 | Holmes et al. | 280/402 |
| 5,123,802 | 6/1992 | Bell . | |
| 5,145,308 | 9/1992 | Vaughn et al. . | |
| 5,228,712 | 7/1993 | Speier | 280/402 |
| 5,236,214 | 8/1993 | Taylor | 280/402 |
| 5,366,338 | 11/1994 | Mortensen . | |
| 5,462,398 | 10/1995 | Hymer | 414/462 |

*Primary Examiner*—Karen B. Merritt
*Assistant Examiner*—Douglas Hess
*Attorney, Agent, or Firm*—Kokjer, Kircher, Bowman & Johnson

[57] ABSTRACT

The present invention is a towing device for two-wheeled vehicles. An elongate channel member is positioned on, and is attached to, a wheel-lift extending from the rear of towing vehicle. The elongate channel member has first and second elongate portions, hingedly and releasibly attached to each other. The elongate channel member, for supporting a two-wheeled vehicle such as a motorcycle, has components for attaching to the lift assembly. The controllable lift assembly of the towing vehicle may be lowered so that the towing device serves as a ramp upon which the motorcycle can be easily rolled. The lift assembly is lifted to place the towing device, with motorcycle thereon, in towing position. A plurality of straps and/or bands are utilized to hold the motorcycle in place on the channel members.

2 Claims, 2 Drawing Sheets

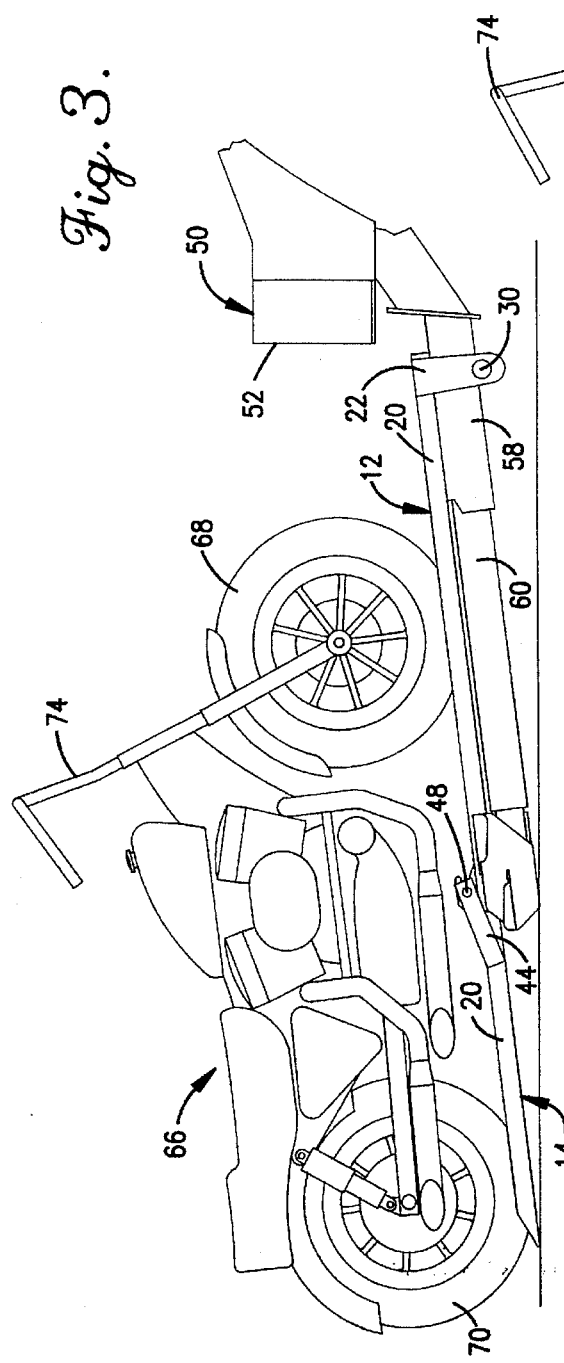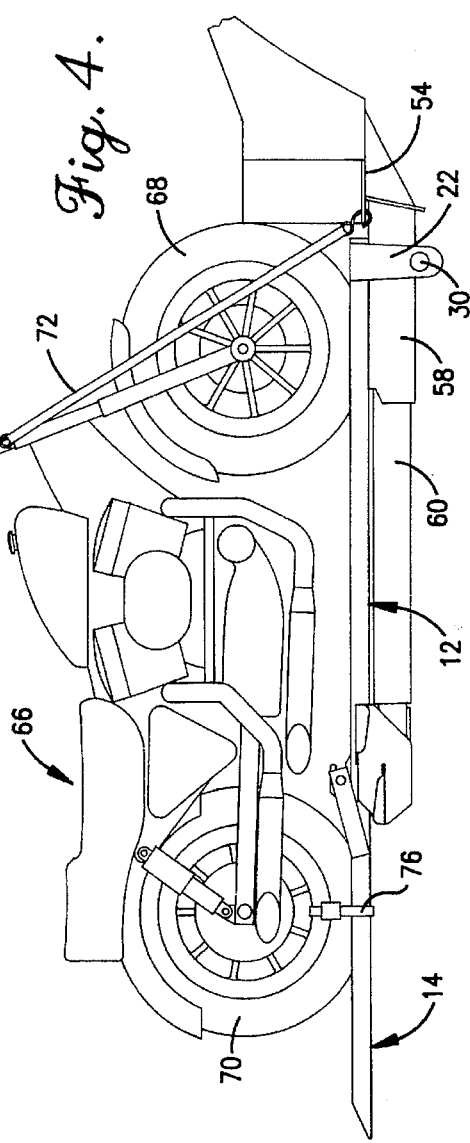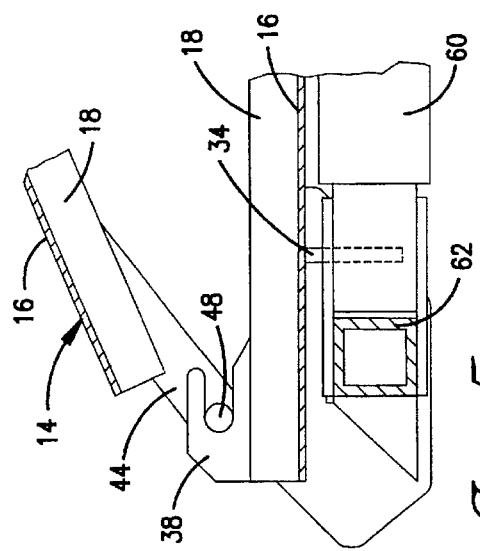

MOTORCYCLE TOWING DEVICE

BACKGROUND OF THE INVENTION

1. Field of the Invention

The present invention is directed to a motorcycle towing device. More specifically, the present invention is directed to a motorcycle towing device which supports both wheels of a motorcycle.

2. Description of the Related Art

Like any other vehicle, motorcycles will sometimes break down and require towing. However, conventional towbars and other devices, found on typical towing vehicles, are not adapted for towing two-wheeled motor vehicles. Accordingly, attempts have been made to develop motorcycle towing apparatus for use with towing vehicles.

One such motorcycle towing device is shown in U.S. Pat. No. 5,145,308. The device attaches to a hitch on a towing vehicle and has a cradle for receiving the front wheel of a motorcycle. However, the rear wheel remains on the ground surface and thus rolls as the motorcycle is towed. With such a device, the motorcycle is generally unstable, particularly when towing at moderate to high speeds or over bumpy roads. Moreover, the device is not useful when the motorcycle to be towed has a damaged rear wheel assembly.

U.S. Pat. No. 5,123,802 illustrates an adapter kit for transporting a motorcycle on the wheel-lift of a tow truck. Particularly, a plurality of rigid bars form a pair of space cradles, in cooperation with a crossbar assembly of the wheel-lift, for receiving the wheels of the motorcycle. The bars must be adjusted to snugly engage the front and rear wheels of the motorcycle. Like other motorcycle towing devices before it, the device described in the '802 patent has encountered problems with maintaining the motorcycle stable during towing. Moreover, due to the weight of many motorcycles, it is difficult to roll or lift the motorcycle into position within the cradles. Additionally, because the motorcycle is positioned transversely with respect to the direction of towing, it is not only subjected to the wind and passing air, thus creating instability, but an entire side surface of the motorcycle is also subjected to road debris eschewed from the wheels of the towing vehicle.

Accordingly, the need exists for a motorcycle towing device which allows the motorcycle to be easily positioned thereon. Additionally, the need exists for a motorcycle towing device which provides for stable transportation of a motorcycle. The present invention fills these and other needs, and overcomes the drawbacks of the prior art.

SUMMARY OF THE INVENTION

It is an object of the present invention is to provide a motorcycle towing device for attachment to the wheel-lift of a towing vehicle.

It is a further object of the present invention to provide a motorcycle towing device upon which both wheels will be supported during towing of the motorcycle.

It is a further object of the present invention to provide a motorcycle towing device which permits the motorcycle to be easily positioned upon the towing device.

It is yet another object of the present invention to provide a motorcycle towing device which provides stable transportation of the motorcycle during towing thereof.

It is another object of the present invention to provide a motorcycle towing device that is inexpensive and easy to manufacture.

These and other objects are achieved by a motorcycle towing device having an elongate channel for receiving the motorcycle to be towed. The elongate channel is attachable to the wheel-lift of a tow vehicle. Particularly, conventional wheel-lifts have an elongate member which telescopes outwardly from the rear of the towing vehicle. At the outermost end of the elongate member is a crossbar. Such wheel-lift assemblies are typically hydraulically controlled and are utilized for towing automobiles.

The elongate channel of the motorcycle towing device of the present invention is adapted to rest on and attach to the elongate member of the wheel-lift. The channel preferably extends outwardly beyond the outermost end of the wheel-lift and, when the wheel-lift is tilted downwardly, thereby provides a ramp upon which the motorcycle can be easily rolled. Straps are provided for securing the motorcycle to the elongate channel upon which it resides. Preferably, straps are connected to the rear of the towing vehicle and to the handlebars of the motorcycle and, additionally, a strap is positioned about the elongate channel of the motorcycle towing device and through the rear wheel of the motorcycle. The wheel-lift is raised upwardly for towing, thereby supporting the motorcycle in an elevated position behind the towing vehicle. With the present invention, the front end of the motorcycle is in close relationship to (and perhaps touches) the rear of the towing vehicle. Moreover, the motorcycle is positioned in alignment with the direction of towing.

In a preferred embodiment, the elongate channel of the towing device of the present invention has first and second portions attached to each other. In such an embodiment, the overall physical size of each component is reduced thereby improving handling ease and storage efficiency.

BRIEF DESCRIPTION OF THE DRAWINGS

The objects and features of the invention noted above are explained in more detail with reference to the drawings, in which like reference numerals denote like elements, and in which:

FIG. 3 is an elevational view of the motorcycle towing device of the present invention, in position on the wheel-lift of the towing vehicle, for illustrating positioning of the motorcycle onto the towing device;

FIG. 4 is an elevational view of a motorcycle secured in position on the motorcycle towing device of the present invention when in towing position; and FIG. 5 is a cross-sectional view illustrating the preferred manner of attaching components of the present invention.

DETAILED DESCRIPTION OF THE INVENTION

Figure 1:
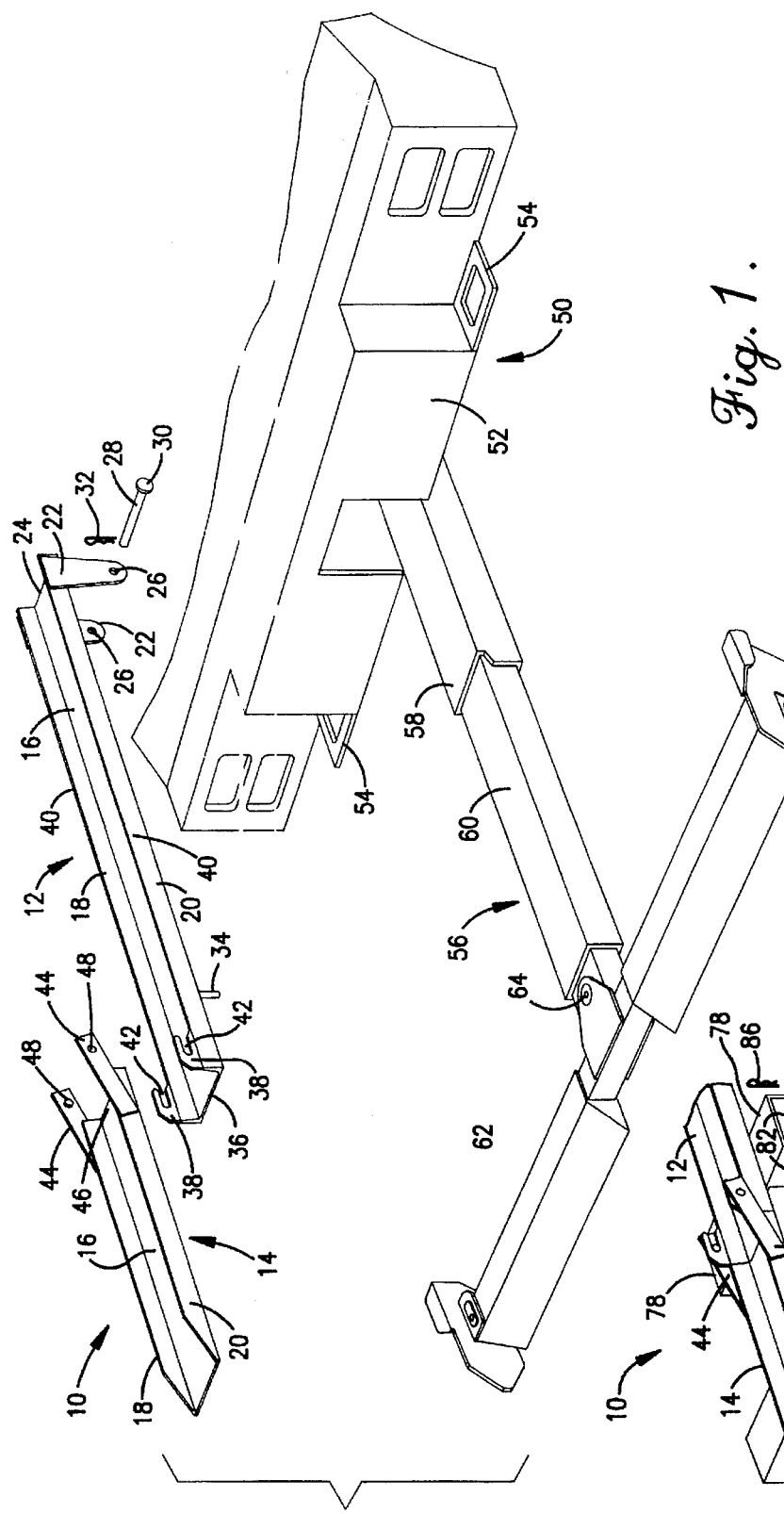
FIG. 1 is a perspective view of a wheel-lift assembly on the rear of a towing vehicle and of a first preferred embodiment of the motorcycle towing device of the present invention.

With reference initially to FIG. 1, the motorcycle towing device of the present invention is denoted generally by reference numeral 10. Motorcycle towing device 10 includes an elongate channel member comprised, in the preferred embodiment, of a first channel member portion 12 and a second channel member portion Each channel member portion 12, 14, has a motorcycle support area 16 and first and second upwardly extending sidewall members, 18, 20. First channel member 12 has a pair of flanges 22 positioned proximate its frontal end 24. Particularly, flanges 22 are positioned to extend downwardly from sidewalls 18 and 20, as shown. Each flange 22 has an aperture 26 positioned proximate a lower end thereof. Apertures 26 are in axial alignment and are adapted to receive a rod 28, having a head 30 at one end thereof. It will be readily understood that the rod 28 is dimensioned to fit through apertures 26, but that the head member 30 has a diameter greater than apertures 26. A safety pin 32 is provided to secure rod 28 into position once threaded through apertures 26, as will be readily understood.

In the first preferred embodiment of FIG. 1, first channel member 12 of motorcycle towing device 10 has a post 34 positioned to the underside surface of motorcycle support area 16. Post 34 is preferably positioned proximate a rear end 36 of first channel member 12, without being positioned at the extreme end thereof. First channel member 12 also has a pair of receiving brackets 38 positioned on respective upper edge surfaces 40 of sidewalls 18 and 20, as shown. Each receiving bracket 38 has a slot 42 aligned longitudinally with the first channel member 12.

Turning now to second channel member 14, second channel member 14 has a pair of links 44 fixedly attached to the outer surface of sidewalls 18 and 20, as shown. Links 44 extend outwardly from a first end 46 of second channel member 14. Links 44 are also preferably arranged to angle slightly upwardly from channel member 14. Each link 44 has a small pin 48 extending outwardly from an inner side surface of the link 44. As described in greater detail below, pins 48 are adapted to be received by slots 42 of receiving brackets 38. The combination of links and pins are referred to herein as linkages.

With reference still to FIG. 1, the rear of a towing vehicle is denoted generally by reference numeral 50. As shown, the rear of towing vehicle 50 has a rear bumper 52 with rigid frame members 54 to which ropes, straps, etc. may be fastened. A conventional wheel-lift assembly extends outwardly from the rear of tow vehicle 50, and is depicted generally by reference numeral 56. Wheel-lift assemblies, such as that shown by reference numeral 56 in FIG. 1, are conventional in the towing industry.

A fixed sheath 58 telescopically receives a towbar portion 60 to which a crossbar assembly 62 is connected. Wheel-lift assembly 56 is controlled hydraulically from a hydraulic power source (not shown) on the towing vehicle. Wheel-lift assembly 56 is 15 adapted to move upwardly and downwardly and, additionally, outwardly and inwardly from the rear of the vehicle as will be readily understood by those with skill in the art.

As shown in FIG. 1, and as is common on many wheel-lifts, an aperture 64 is positioned at substantially the junction of member 60 and crossbar 62. Referring now to FIGS. 3–5, it is seen that motorcycle towing device 10 and, particularly, first channel member 12 is positioned onto the upper surface of wheel-lift assembly 56. Particularly, first channel member 12 rests on the combination of sheath 58 and elongate member 60 extending outwardly therefrom. It will be appreciated that outwardly extending member 60 is controllable by hydraulics such that it may be appropriately positioned to receive motorcycle towing device 10.

The width of channel member 12 is preferably such that downwardly extending flanges 22 position about sheath 58 in close relationship therewith. Rod 28 is then positioned beneath sheath 58 through aligning apertures 26, and safety pin 32 is secured in place. As best illustrated in FIG. 5, post 34 on the underside surface of elongate first channel member 12 is received by aperture 64 in the wheel-lift assembly 56. Second channel member 14 is then connected to first channel member 12 by placement of pins 48, on links 44, into the receiving slots 42 of receiving brackets 38. As will be readily understood, the operation of links 44, pins 48, and receiving brackets 38 permit a hinging action between first channel member 12 and second channel member 14.

As illustrated in FIG. 3, second channel member 14 is hinged downwardly in a manner such that the frontal end 46 of second channel member 14 engages with the rear end 36 of first channel member 12, thereby forming an extended elongate channel member. As illustrated in FIG. 3, wheel-lift assembly 56 is controlled to position it downwardly such that motorcycle towing device 10 of the present invention provides a ramp upon which a motorcycle, denoted generally by the reference numeral 66, may be easily rolled. In accordance with the principles of the present invention, both the front wheel 68 and the rear wheel 70 of motorcycle 66 rests on motorcycle support area 16 of the combined channel members 12, 14. Upwardly extending sidewalls 18, 20 assist in guiding the cycle onto motorcycle towing device 10.

As shown in FIG. 4, motorcycle 66 is preferably rolled onto motorcycle towing device 10 until front wheel 68 of motorcycle 66 engages the rear of towing vehicle 50. Motorcycle 66 is held in place by a strap 72 connected, as shown, to the handlebars 74 of motorcycle 66 and a frame 54 on bumper 52 of the rear of vehicle 50. An identical strap 72 is also connected in the same manner on the opposite side of motorcycle 66. Additionally, a strap or band 76 is looped through rear wheel 70, as shown, and around second channel member 14 of motorcycle towing device 10. Straps 72 and 76 hold motorcycle 66 securely onto motorcycle towing device 10. It should be understood that straps 72 are shown illustratively as hooked to the handlebar 74 of motorcycle 66 and that many other tying or engaging arrangements may be preferably utilized.

Figure 2:
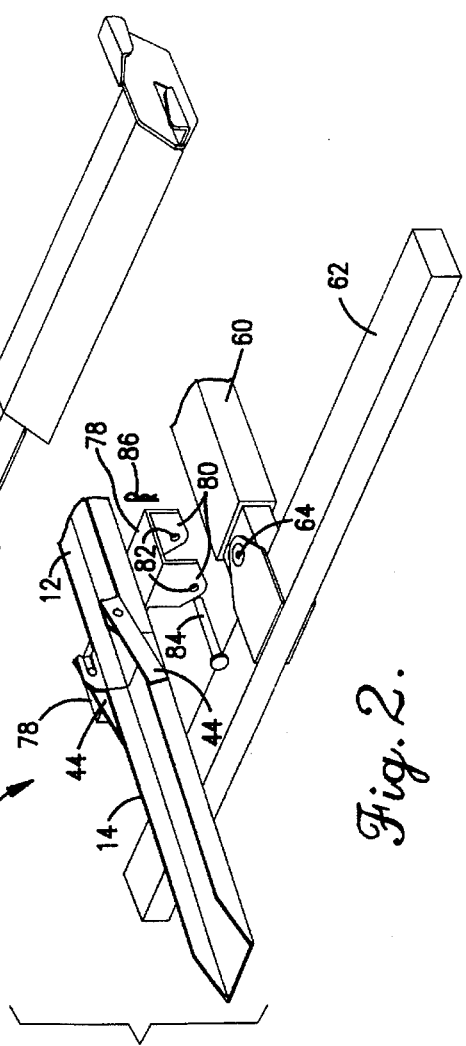
FIG. 2 is a perspective view of a second preferred embodiment of the motorcycle towing device of the present invention.

With reference now to FIG. 2, an alternative embodiment of the present invention is shown. A motorcycle towing device 10, as shown in FIG. 2, is constructed and operates in essentially the same manner as previously described. However, post 34 as shown in the first embodiment, is removed on the embodiment shown in FIG. 2. In this regard, some wheel-lift assemblies on towing vehicles do not have the aperture 64 for receiving post 34. It will be appreciated that, for those vehicles that do have such an aperture, post 34 is useful for holding motorcycle towing device 10 in place during use. The embodiment of FIG. 2 has alternate components for securing motorcycle towing device 10 to the wheel-lift assembly 56. It should be understood that the front end 24 of towing device 10, and particularly the flanges 22 and associated components are not changed in the embodiment of FIG. 2.

Particularly, a bracket 78 is secured to the underside surface of motorcycle towing device 10 and, preferably, to the underside surface of first channel member 12 thereof. Bracket 78 is positioned transversely to the longitudinal axis of motorcycle towing device 10 and, furthermore, extends outwardly beyond the width of towing device 10. Each outer end of bracket 78 has downwardly extending walls or flanges 80 having apertures 82 therein. It will be readily appreciated that bracket 78 is thus adapted to rest on crossbar 62 and that a rod 84 and pin 86 will thus assist in holding motorcycle towing device 10 securely in place. Again, it will be understood that such a rod and pin arrangement is utilized on each side of the motorcycle towing device 10. Additionally, the precise configuration of the downwardly extending flanges 80 will be adapted to accommodate different sizes and configurations of towing bar 62.

The motorcycle towing device 10 of the present invention provides a highly useful device for towing two-wheeled motor vehicles. The elongate channel arrangement of the present invention provides a convenient ramp upon which the motorcycle 66 may be easily rolled. Additionally, the alignment of motorcycle towing device 10 with the direction of towing provides stability during transportation of motorcycle 66. Additionally, removal of motorcycle 66 from motorcycle towing device 10 of the present invention is accomplished very easily by simply lowering the wheel-lift assembly, unhooking the straps and bands, and unrolling the motorcycle. Although motorcycle towing device 10 may be comprised of a single channel member, providing a plurality of channel members, and particularly first and second channel members, permits the towing device 10 to be easily assembled and disassembled, as well as stored.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A device for towing a two-wheeled vehicle behind and in combination with a towing vehicle, said towing vehicle having a lift assembly comprising an elongate lifting member extending outwardly from the rear of said vehicle, said towing device comprising:

an elongate support member, positioned on and attached to said lifting member of said towing vehicle, for supporting said two-wheeled vehicle by its said two wheels, wherein said elongate support member comprises a channel having a support area and side walls and means for attaching said elongate support member to said elongate lifting member, said attaching means comprising first and second flanges located proximate a frontal end of said elongate member and extending downwardly from opposite sides of said elongate support member, wherein said elongate lifting member is received between said flanges, wherein a lower end of each said flange extends downwardly past a lower edge of said lifting member, each said flange having an aperture therein proximate said lower end, said apertures in axial alignment with each other and adapted to receive a rod; and means for holding said two-wheeled vehicle on said support member, wherein said elongate lifting member on said towing vehicle has an aperture proximate an outer end thereof, and wherein said elongate support member of said towing device has a post extending downwardly from an underside surface thereof, said aperture adapted to receive said post to thereby secure said elongate support member on said elongate lifting member.

2. A device for towing a two-wheeled vehicle behind and in combination with a towing vehicle, said towing vehicle having a lift assembly comprising an elongate lifting member extending outwardly from the rear of said vehicle, said towing device comprising:

an elongate support member, positioned on and attached to said lifting member of said towing vehicle, for supporting said two-wheeled vehicle by its said two wheels, wherein said elongate support member comprises a channel having s support area and side walls and means for attaching said elongate support member to said elongate lifting member, said attaching means comprising first and second flanges located proximate a frontal end of said elongate member and extending downwardly from opposite sides of said elongate support member, wherein said elongate lifting member is received between said flanges, wherein a lower end of each said flange extends downwardly past a lower edge of said lifting member, each said flange having an aperture therein proximate said lower end, said apertures in axial alignment with each other and adapted to receive a rod; and means for holding said two-wheeled vehicle on said support member, wherein said elongate lifting member further comprises a cross-bar at an outer end thereof, said attaching means further comprising a bracket, comprising an inverted U, positioned on said elongate support member for receiving said cross-bar.

* * * * *